United States Patent
Phan et al.

(10) Patent No.: US 10,348,822 B2
(45) Date of Patent: Jul. 9, 2019

(54) SYSTEM AND METHOD FOR CLUSTERING IN A MULTITENANT APPLICATION SERVER ENVIRONMENT

(71) Applicant: ORACLE INTERNATIONAL CORPORATION, Redwood Shores, CA (US)

(72) Inventors: Lenny Phan, Sunnyvale, CA (US); Mohamed Abdelaziz, Santa Clara, CA (US); Rajiv Mordani, Sunnyvale, CA (US); Nazrul Islam, Santa Clara, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 81 days.

(21) Appl. No.: 14/866,601

(22) Filed: Sep. 25, 2015

(65) Prior Publication Data

US 2016/0094406 A1 Mar. 31, 2016

Related U.S. Application Data

(60) Provisional application No. 62/056,440, filed on Sep. 26, 2014.

(51) Int. Cl.
*H04L 12/24* (2006.01)
*H04L 29/08* (2006.01)

(52) U.S. Cl.
CPC ...... *H04L 67/1095* (2013.01); *H04L 41/0843* (2013.01); *H04L 41/0893* (2013.01);
(Continued)

(58) Field of Classification Search
CPC . H04L 67/1095; H04L 41/12; H04L 41/0843; H04L 41/0893; H04L 67/148; H04L 67/1004
See application file for complete search history.

(56) References Cited

U.S. PATENT DOCUMENTS

2007/0143299 A1* 6/2007 Huras ............ G06F 9/466
2008/0320269 A1* 12/2008 Houlihan ......... G06F 9/4856
711/203
(Continued)

FOREIGN PATENT DOCUMENTS

CN 101639835 2/2010
CN 102170457 8/2011
(Continued)

OTHER PUBLICATIONS

European Patent Office, International Searching Authority, International Search Report and Written Opinion dated Apr. 24, 2015 for International Application No. PCT/US2015/012268, 10 Pages.
(Continued)

*Primary Examiner* — Clayton R Williams
*Assistant Examiner* — Tania M Pena-Santana
(74) *Attorney, Agent, or Firm* — Tucker Ellis LLP

(57) ABSTRACT

In accordance with an embodiment, described herein is a system and method for supporting clustering in a multitenant application server environment. The system includes a domain with a plurality of server clusters, and a plurality of partitions, wherein each cluster is homogenously configured and targeted by one or more partitions. An application programming interface (API) can be used to initiate a resource group across-cluster migration within a partition. The API can invoke a replication manager, which queries a target cluster for a runtime topology for use in determining where to store primary session; migrates the primary session to a determined server instance in the target cluster. Additional clustering features, such as cluster messaging service, leasing service, singleton service management, session replication, clustered JNDI, and use of domain front-end load balancing, can be supported.

20 Claims, 9 Drawing Sheets

(52) U.S. Cl.
CPC ......... *H04L 41/12* (2013.01); *H04L 67/1004* (2013.01); *H04L 67/148* (2013.01)

(56) References Cited

U.S. PATENT DOCUMENTS

| | | | | |
|---|---|---|---|---|
| 2009/0024851 | A1* | 1/2009 | Andrade | H04L 9/3234 713/176 |
| 2010/0030995 | A1* | 2/2010 | Wang | G06F 17/30339 711/173 |
| 2011/0213870 | A1 | 9/2011 | Cai | |
| 2012/0072597 | A1 | 3/2012 | Teather | |
| 2012/0110566 | A1 | 5/2012 | Park | |
| 2013/0151683 | A1* | 6/2013 | Jain | G06F 3/0611 709/223 |
| 2014/0068207 | A1* | 3/2014 | Aslot | G06F 12/12 711/160 |
| 2014/0344395 | A1* | 11/2014 | Alexander | G06F 9/4856 709/217 |
| 2015/0096011 | A1* | 4/2015 | Watt | H04L 63/0272 726/15 |

FOREIGN PATENT DOCUMENTS

| | | |
|---|---|---|
| CN | 102333115 | 1/2012 |
| CN | 102571821 | 7/2012 |
| CN | 102571916 | 7/2012 |
| CN | 102609271 | 7/2012 |
| CN | 102932404 | 2/2013 |
| CN | 102932405 | 2/2013 |
| CN | 103455512 | 12/2013 |

OTHER PUBLICATIONS

Chinese Patent Office, Office Action dated Jul. 20, 2018 for Application No. 201580003512.6, 8 pages.

* cited by examiner

SYSTEM AND METHOD FOR CLUSTERING IN A MULTITENANT APPLICATION SERVER ENVIRONMENT

CLAIM OF PRIORITY AND CROSS-REFERENCE TO RELATED APPLICATIONS

This application claims the benefit of priority to U.S. Provisional Application titled "SYSTEM AND METHOD FOR CLUSTERING IN A MULTITENANT APPLICATION SERVER ENVIRONMENT", Application No. 62/056,440, filed Sep. 26, 2014; and is related to U.S. Provisional Application titled "SYSTEM AND METHOD FOR SUPPORTING MULTITENANCY IN AN APPLICATION SERVER, CLOUD, OR OTHER ENVIRONMENT", Application No. 61/929,888, filed Jan. 21, 2014; and U.S. Patent Application titled "SYSTEM AND METHOD FOR SUPPORTING MULTI-TENANCY IN A APPLICATION SERVER, CLOUD, OR OTHER ENVIRONMENT", application Ser. No. 14/601,883, filed Jan. 21, 2015; each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to application servers and cloud environments, and are particularly related to a system and method for supporting clustering in a multitenant application server environment.

BACKGROUND

Software application servers, examples of which include Oracle WebLogic Server (WLS) and Glassfish, generally provide a managed environment for running enterprise software applications. Recently, technologies have also been developed for use in cloud environments, which allow users or tenants to develop and run their applications within the cloud environment, and to take advantage of distributed resources provided by the environment. As such, clustering features and services in a traditional application server environment may need to be modified for such a cloud environment.

SUMMARY

In accordance with an embodiment, described herein is a system and method for supporting clustering in a multitenant application server environment. The system includes a domain with a plurality of server clusters, and a plurality of partitions, wherein each cluster is homogenously configured and targeted by one or more partitions. An application programming interface (API) can be used to initiate a resource group across-cluster migration within a partition. The API can invoke a replication manager, which queries a target cluster for a runtime topology for use in determining where to store primary session; migrates the primary session to a determined server instance in the target cluster. Additional clustering features, such as cluster messaging service, leasing service, singleton service management, session replication, clustered JNDI, and use of domain front-end load balancing, can be supported.

DETAILED DESCRIPTION

In accordance with an embodiment, described herein is a system and method for supporting clustering in a multitenant application server environment. The system includes a domain with a plurality of server clusters, and a plurality of partitions, wherein each cluster is homogenously configured and targeted by one or more partitions. An application programming interface (API) can be used to initiate a resource group across-cluster migration within a partition. The API can invoke a replication manager, which queries a target cluster for a runtime topology for use in determining where to store primary session; migrates the primary session to a determined server instance in the target cluster. Additional clustering features, such as cluster messaging service, leasing service, singleton service management, session replication, clustered JNDI, and use of domain front-end load balancing, can be supported.

Application Server (e.g., Multi-Tenant, MT) Environment

Figure 1:
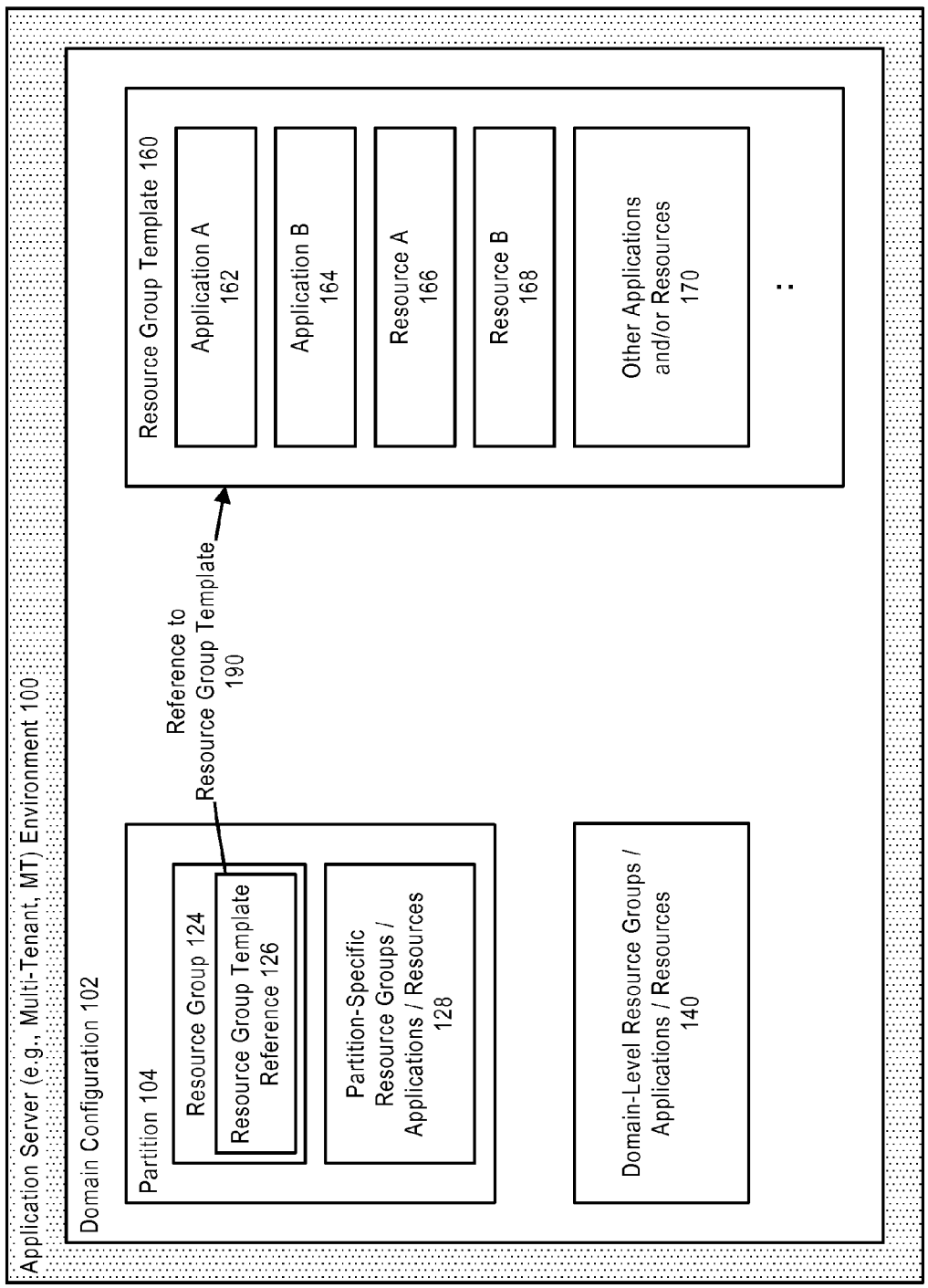
FIG. 1 illustrates a system for supporting multi-tenancy in an application server, cloud, or other environment, in accordance with an embodiment.

FIG. 1 illustrates a system for supporting multi-tenancy in an application server, cloud, or other environment, in accordance with an embodiment.

As illustrated in FIG. 1, in accordance with an embodiment, an application server (e.g., multi-tenant, MT) environment 100, or other computing environment which enables the deployment and execution of software applications, can be configured to include and operate according to a domain 102 configuration that is used at runtime to define an application server domain.

In accordance with an embodiment, the application server can include one or more partitions 104 that are defined for use at runtime. Each partition can be associated with a globally unique partition identifier (ID) and partition configuration, and can further include one or more resource groups 124, together with a reference to a resource group template 126 and/or partition-specific applications or resources 128. Domain-level resource groups, applications and/or resources 140 can also be defined at the domain level, optionally with a reference to a resource group template.

Each resource group template 160 can define one or more applications A 162, B 164, resources A 166, B 168, and/or other deployable applications or resources 170, and can be referenced by a resource group. For example, as illustrated in FIG. 1, resource group 124 in partition 104 can reference 190 resource group template 160.

Generally, a system administrator can define partitions, domain-level resource groups and resource group templates, and security realms; while a partition administrator can define aspects of their own partition, for example, by creating partition-level resource groups, deploying applications to the partition, or referencing specific realms for the partition.

Figure 2:
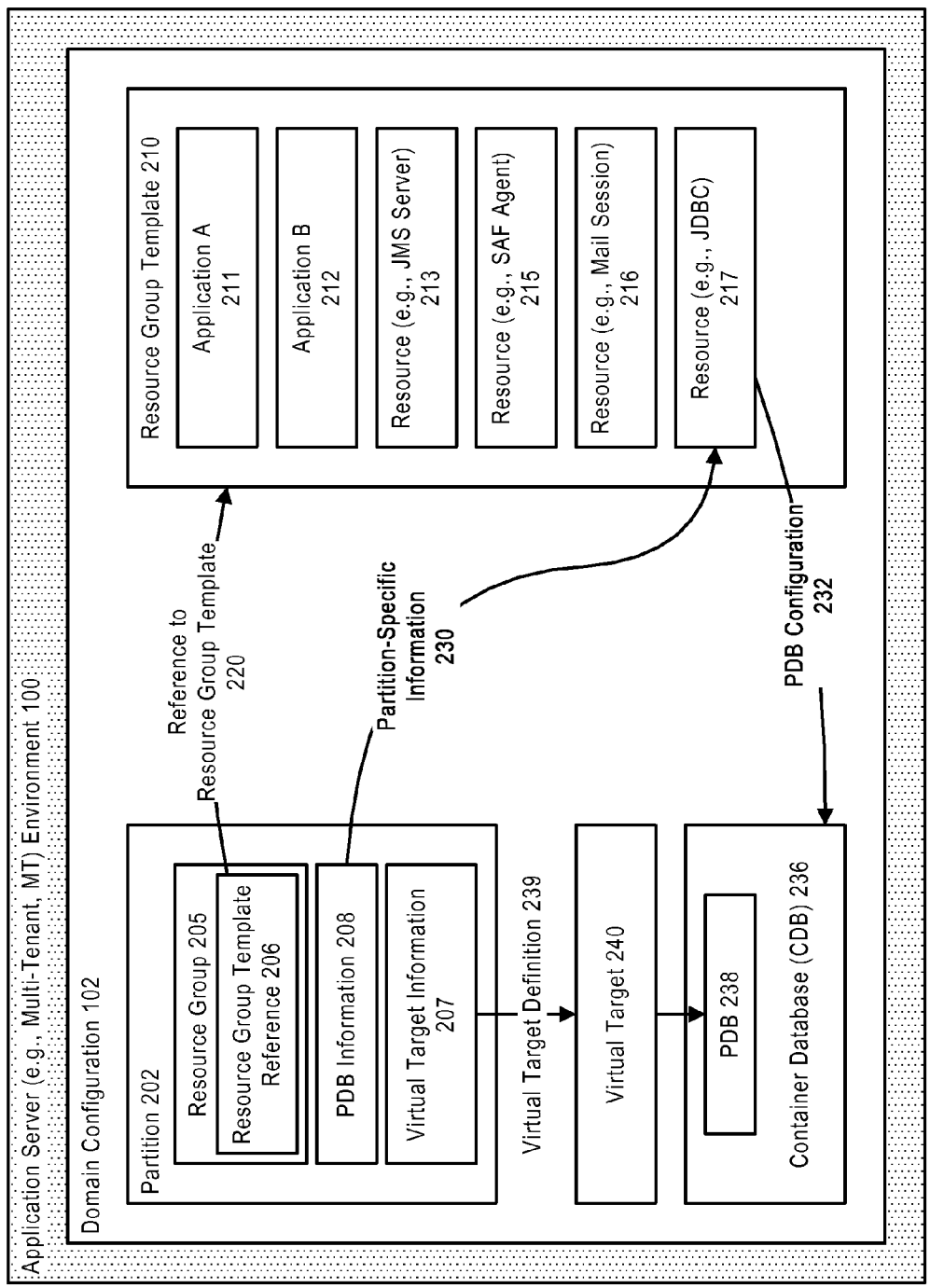
FIG. 2 further illustrates a system for supporting multi-tenancy in an application server, cloud, or other environment, in accordance with an embodiment.

FIG. 2 further illustrates a system for supporting multi-tenancy in an application server, cloud, or other environment, in accordance with an embodiment.

As illustrated in FIG. 2, in accordance with an embodiment, a partition 202 can include, for example, a resource group 205 which includes a reference 206 to a resource group template 210, a virtual target (e.g., virtual host) information 207, and a pluggable database (PDB) information 208. A resource group template (e.g., 210) can define, for example, a plurality of applications A 211 and B 212, together with resources such as a Java Message Server (JMS) server 213, store-and-forward (SAF) agent 215, mail session component 216, or Java Database Connectivity (JDBC) resource 217.

The resource group template illustrated in FIG. 2 is provided by way of example; in accordance with other embodiments, different types of resource group templates and elements can be provided.

In accordance with an embodiment, when a resource group within a partition (e.g., 202) references 220 a particular resource group template (e.g., 210), information associated with a particular partition can be used in combination with the referenced resource group template, to indicate a partition-specific information 230, for example a partition-specific PDB information. The partition-specific information can then be used by the application server to configure resources, for example a PDB resource, for use by the partition. For example, partition-specific PDB information associated with partition 202 can be used, by the application server, to configure 232 a container database (CDB) 236 with an appropriate PDB 238, for use by that partition.

Similarly, in accordance with an embodiment, a virtual target information associated with a particular partition can be used to define 239 a partition-specific virtual target 240, for use by the partition, e.g., baylandurgentcare.com, which can then be made accessible via a uniform resource locator (URL), e.g., http://baylandurgentcare.com.

Figure 3:
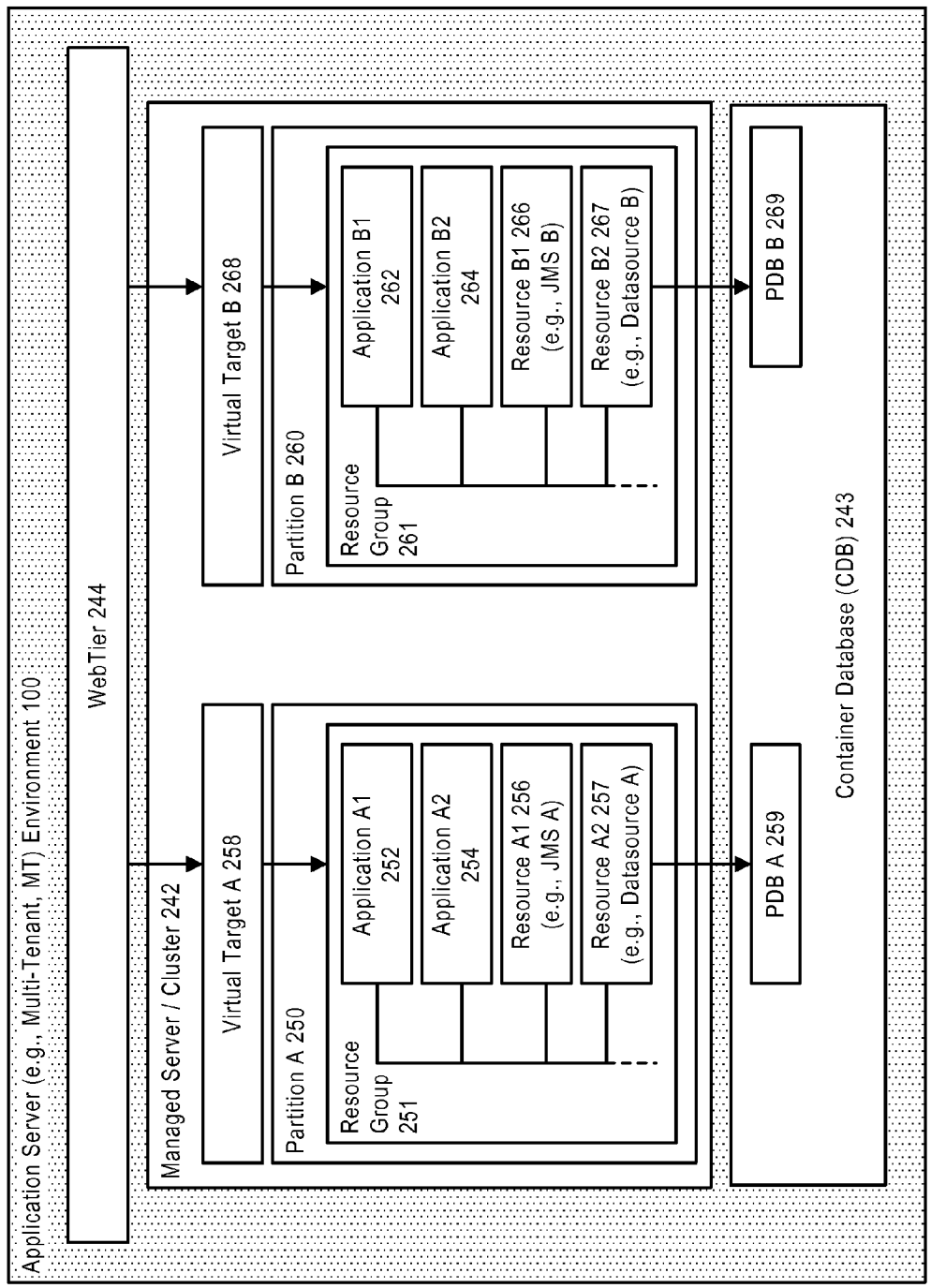
FIG. 3 further illustrates a system for supporting multi-tenancy in an application server, cloud, or other environment, in accordance with an embodiment.

FIG. 3 further illustrates a system for supporting multi-tenancy in an application server, cloud, or other environment, in accordance with an embodiment.

In accordance with an embodiment, a system configuration such as a config.xml configuration file, is used to define a partition, including configuration elements for resource groups associated with that partition, and/or other partition properties. Values can be specified per-partition using property name/value pairs.

In accordance with an embodiment, a plurality of partitions can be executed within a managed server/cluster 242, or a similar environment which can provide access to a CDB 243, and which are accessible via a web tier 244. This allows, for example, a domain or partition to be associated with one or more of the PDBs (of the CDB).

In accordance with an embodiment, each of the plurality of partitions, in this example partition A 250 and partition B 260, can be configured to include a plurality of resources associated with that partition. For example, partition A can be configured to include a resource group 251 which contains an application A1 252, application A2 254, and JMS A 256, together with a datasource A 257 associated with PDB A 259, wherein the partition is accessible via a virtual target A 258. Similarly, partition B 260 can be configured to include a resource group 261 which contains an application B1 262, application B2 264, and JMS B 266, together with a datasource B 267 associated with PDB B 269, wherein the partition is accessible via a virtual target B 268.

While several of the above examples illustrate use of CDB and PDBs, in accordance with other embodiments, other types of multi-tenant or non-multi-tenant databases can be supported, wherein a particular configuration can be provided for each partition, for example through the use of schemas, or the use of different databases.

Resources

In accordance with an embodiment, a resource is a system resource, application, or other resource or object that can be deployed to a domain of the environment. For example, in accordance with an embodiment, a resource can be an application, JMS, JDBC, JavaMail, WLDF, data source, or other system resource or other type of object that can be deployed to a server, cluster, or other application server target.

Partitions

In accordance with an embodiment, a partition is a runtime and administrative subdivision or slice of a domain that can be associated with a partition identifier (ID) and configuration, and can contain applications and/or refer to domain-wide resources through the use of resource groups and resource group templates.

Generally, a partition can contain its own applications, refer to domain wide applications via resource group templates, and have its own configuration. Partitionable entities can include resources, for example JMS, JDBC, JavaMail, WLDF resources, and other components, such as JNDI namespace, network traffic, work managers, and security policies and realms. In the context of a multi-tenant environment, the system can be configured to provide tenant access to the administrative and runtime aspects of partitions associated with a tenant.

In accordance with an embodiment, each resource group within a partition can optionally reference a resource group template. A partition can have multiple resource groups, and each of them can reference a resource group template. Each partition can define properties for configuration data that is not specified in the resource group templates to which the partition's resource groups refer. This enables the partition to act as a binding of deployable resources defined in a resource group template, to specific values for use with that partition. In some cases, a partition can override configuration information specified by a resource group template.

In accordance with an embodiment, a partition configuration, as defined for example by a config.xml configuration file, can include a plurality of configuration elements, for example: "partition", which contains the attributes and child elements that define the partition; "resource-group", which contains the applications and resources deployed to the partition; "resource-group-template", which contains applications and resources defined by that template; "jdbc-system-resource-override", which contains a database-specific service name, user name, and password; and "partition-properties", which contains property key values that can be used for macro replacement in resource group templates.

Upon startup, the system can use the information provided by the configuration file to generate partition-specific configuration elements for each resource, from the resource group template.

Resource Groups

In accordance with an embodiment, a resource group is a named, fully-qualified collection of deployable resources that can be defined either at a domain or partition level, and can reference a resource group template. The resources in a resource group are considered fully-qualified in that the administrator has provided all of the information needed to start or connect to those resources, for example the credentials for connecting to a data source, or the targeting information for an application.

A system administrator can declare resource groups at the domain level, or at the partition level. At the domain level, a resource group provides a convenient way to group related resources. The system can manage resources declared in a domain-level resource group the same as ungrouped resources, so that the resources can be started during system start-up, and stopped during system shut-down. An administrator can also stop, start, or remove a resource in a group individually, and can act on all the resources in a group implicitly by operating on the group. For example, stopping a resource group stops all of the resources in the group that are not already stopped; starting the resource group starts any resources in the group that are not already started; and removing the resource group removes all of the resources contained in the group.

At the partition level, a system or partition administrator can configure zero or more resource groups in a partition, subject to any security restrictions. For example, in a SaaS use case, various partition-level resource groups can refer to domain-level resource group templates; while in a PaaS use case, partition-level resource groups can be created that do not refer to resource group templates, but instead represent applications and their related resources that are to be made available within that partition only.

In accordance with an embodiment, resource grouping can be used to group together applications and the resources they use as a distinct administrative unit within the domain. For example, in the medical records (MedRec) application described below, a resource grouping defines the MedRec application and its resources. Multiple partitions can run the same MedRec resource group, each using a partition-specific configuration information, such that the applications that are part of each MedRec instance are made specific to each partition.

Resource Group Templates

In accordance with an embodiment, a resource group template is a collection of deployable resources that are defined at a domain level, that can be referenced from a resource group, and some of the information required to activate its resources may not be stored as part of the template itself, such that it supports the specification of partition level configuration. A domain can contain any number of resource group templates, each of which can include, for example, one or more related Java applications and the resources on which those applications depend. Some of the information about such resources may be the same across all partitions, while other information may vary from one partition to the next. Not all configuration need be specified at the domain level—partition level configuration can instead be specified in the resource group template through the use of macros, or property name/value pairs.

In accordance with an embodiment, a particular resource group template can be referenced by one or more resource groups. Generally, within any given partition, a resource group template can be referenced by one resource group at a time, i.e., not simultaneously by multiple resource groups within the same partition; however, it can be referenced at the same time by another resource group in a different partition. The object containing the resource group, e.g., the domain or partition, can use property name/value assignments to set the value of any tokens in the resource group template. When the system activates a resource group template using a referencing resource group, it can replace those tokens with values set in the resource group's containing object. In some cases, the system can also use statically-configured resource group templates and partitions to generate runtime configuration for each partition/template combination.

For example, in a SaaS use case, the system can activate the same applications and resources multiple times, including once for each partition that will use them. When an administrator defines a resource group template they can use tokens to represent the information that will be supplied elsewhere. For example, the username to use in connecting to a CRM-related data resource can be indicated in the resource group template as \${CRMDataUsername}.

Tenants

In accordance with an embodiment, in a multi-tenant environment, such as a multi-tenant (MT) application server environment, a tenant is an entity that can be represented by, or otherwise associated with, one or more partitions and/or one or more tenant-aware applications.

For example, tenants can represent distinct user organizations, such as different external companies, or different departments within a particular enterprise (e.g., HR and Finance departments), each of which can be associated with a different partition. A tenant globally unique identity (tenant ID) is the association of a particular user, at a particular moment in time, with a particular tenant. The system can derive which tenant a particular user belongs to from the user identity, for example by referring to a user identity store. The user identity enables the system to enforce those actions that a user is authorized to perform, including, but not limited to, which tenant the user may belong.

In accordance with an embodiment, the system enables isolation of the administration and runtime of different tenants from each other. For example, tenants can configure some behaviors of their applications, and resources to which they have access. The system can ensure that a particular tenant cannot administer artifacts belonging to another tenant; and, at runtime, that the applications working on behalf of a particular tenant refer only to resources associated with that tenant, and not to resources associated with other tenants.

In accordance with an embodiment, a tenant-unaware application is one that contains no logic dealing with tenants explicitly, such that any resources that the application uses may be accessible regardless of what user submitted a request to which the application is responding. In contrast, a tenant-aware application includes logic that explicitly deals with tenants. For example, based on a user's identity the application can derive the tenant to which the user belongs and use that information to access tenant-specific resources.

In accordance with an embodiment, the system enables users to deploy applications that are explicitly written to be tenant-aware, so that application developers can obtain the tenant ID of a current tenant. The tenant-aware application can then use the tenant ID to handle multiple tenants that are using a single instance of the application.

For example, the MedRec application, which supports a single doctor's office or hospital, can be exposed to two different partitions or tenants, e.g., a Bayland Urgent Care tenant, and a Valley Health tenant, each of which is able to access separate tenant-specific resources, such as separate PDBs, without changing the underlying application code.

Exemplary Domain Configuration and Multi-Tenant Environment

In accordance with an embodiment, applications can be deployed to a resource group template at the domain level, or to a resource group that is scoped to a partition or scoped to the domain. Application configuration can be overridden using deployment plans specified per-application, or per-partition.

Figure 4:
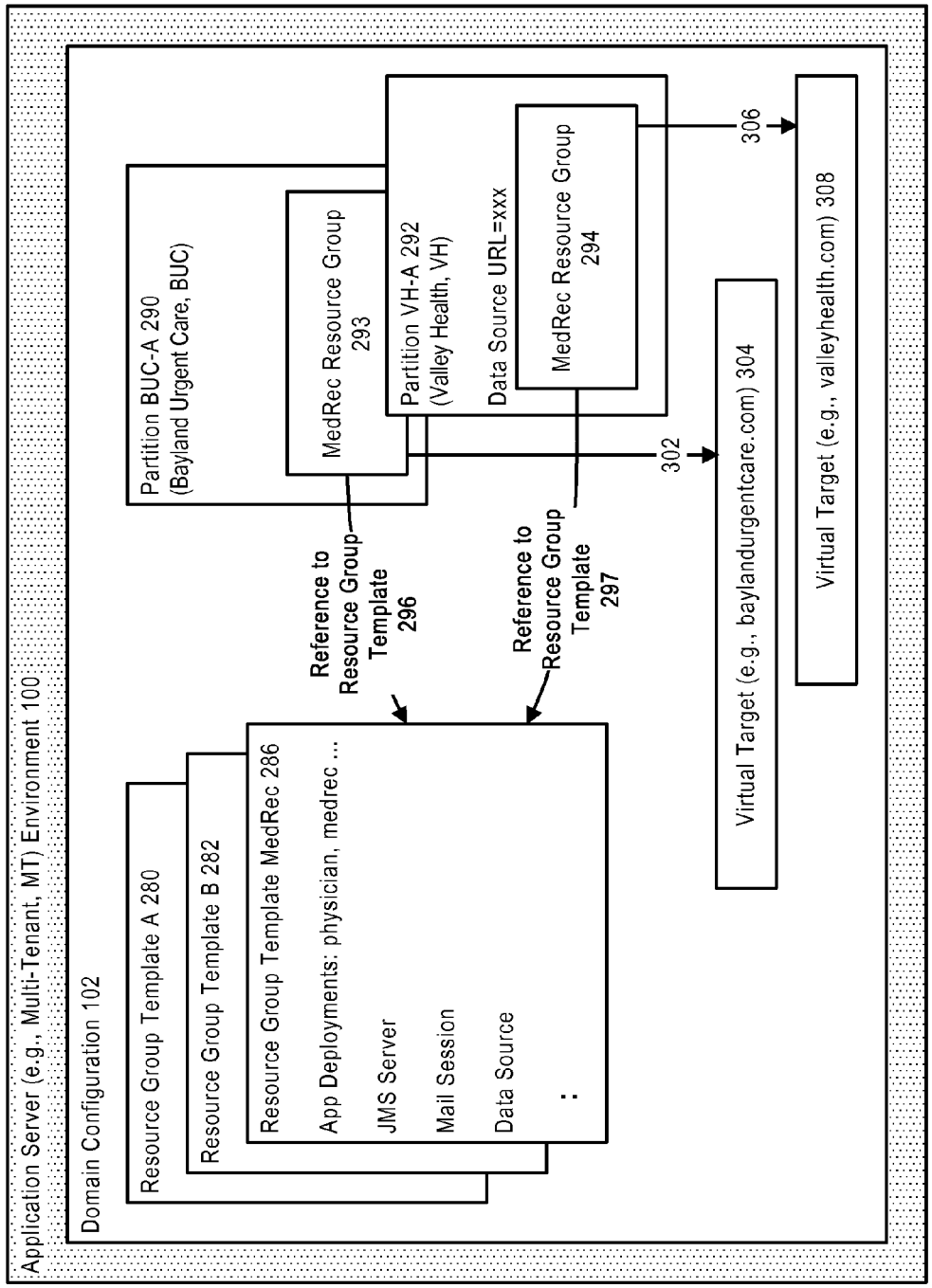
FIG. 4 illustrates a domain configuration for use with an exemplary multi-tenant environment, in accordance with an embodiment.

FIG. 4 illustrates a domain configuration for use with an exemplary multi-tenant environment, in accordance with an embodiment.

In accordance with an embodiment, when the system starts a partition, it creates virtual targets (e.g., virtual hosts) and connection pools, including one for each partition, to respective database instances, according to the provided configuration.

Typically, each resource group template can include one or more related applications and the resources on which those applications depend. Each partition can provide configuration data that is not specified in the resource group templates to which it refers, by providing a binding of the deployable resources in resource group templates to specific values associated with the partition; including, in some cases, overriding certain configuration information specified by the resource group template. This enables the system to activate an application represented by a resource group template differently for each partition, using the property values each partition has defined.

In some instances, a partition may contain resource groups that do not refer to resource group templates, or that directly define their own partition-scoped deployable resources. Applications and data sources that are defined within a partition are generally available only to that partition. Resources can be deployed so that they can be accessed from across partitions using partition: <partitionName>/ <resource JNDI name>, or domain: <resource JNDI name>.

For example, a MedRec application can include a plurality of Java applications, a data source, a JMS server, and a mail session. To run the MedRec application for multiple tenants, the system administrator can define a single MedRec resource group template 286, declaring those deployable resources in the template.

In contrast to domain-level deployable resources, the deployable resources declared in a resource group template may not be fully configured in the template, or cannot be activated as-is, since they lack some configuration information.

For example, the MedRec resource group template may declare a data source used by the applications, but it may not specify a URL for connecting to the database. Partitions associated with different tenants, for example, partition BUC-A 290 (Bayland Urgent Care, BUC) and partition VH-A 292 (Valley Health, VH) can reference one or more resource group templates, by each including a MedRec resource group 293, 294 that references 296, 297 the MedRec resource group template. The reference can then be used to create 302, 306, the virtual targets/virtual hosts for each tenant, including a virtual host baylandurgentcare.com 304 associated with the BUC-A partition, for use by the Bayland Urgent Care tenant; and a virtual host valleyhealth.com 308 associated with the VH-A partition, for use by the Valley Health tenant.

Figure 5:
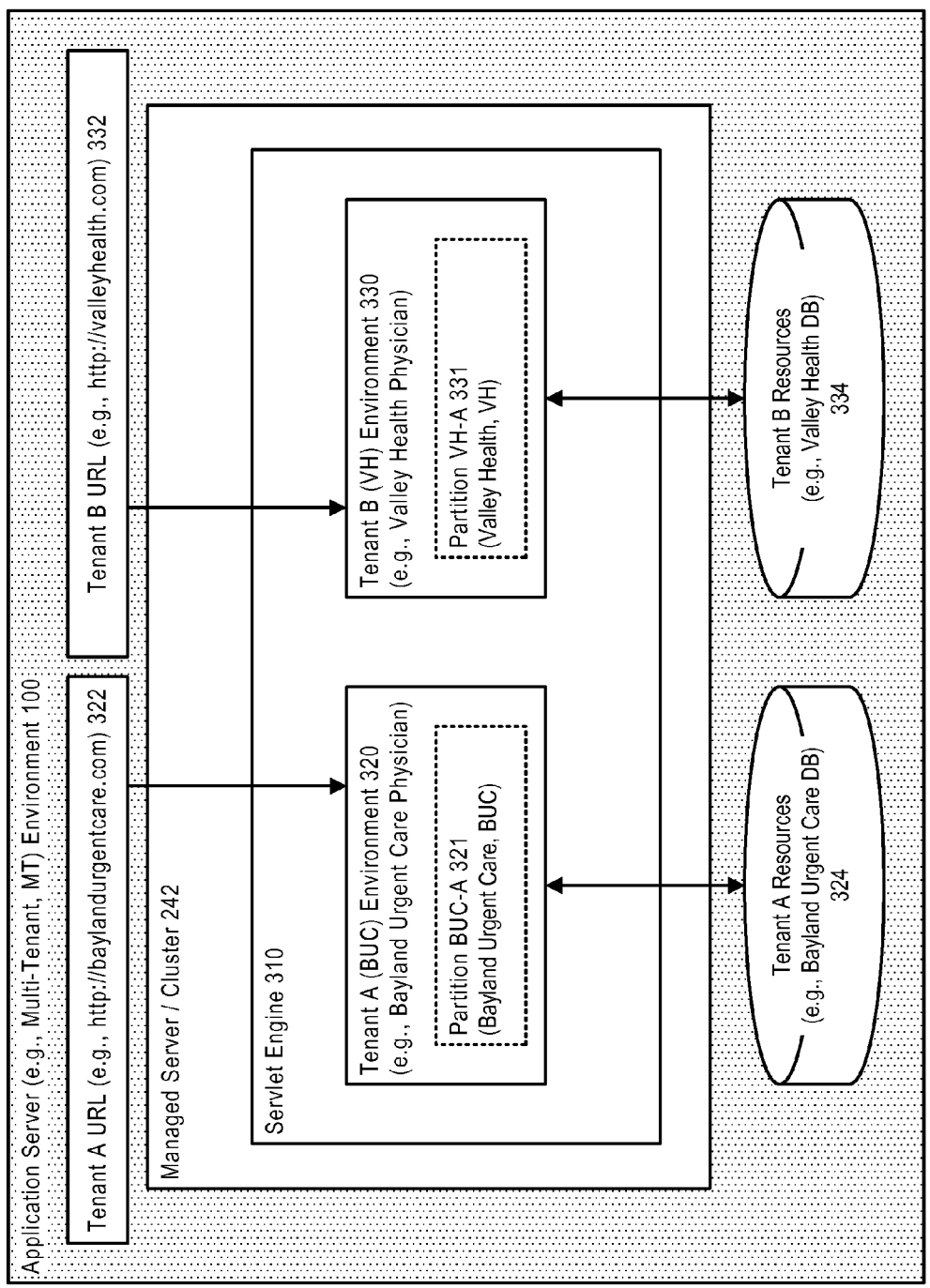
FIG. 5 further illustrates an exemplary multi-tenant environment, in accordance an embodiment.

FIG. 5 further illustrates an exemplary multi-tenant environment, in accordance with an embodiment. As illustrated in FIG. 5, and continuing the example from above, in which two partitions reference the MedRec resource group template, in accordance with an embodiment, a servlet engine 310 can be used to support a plurality of tenant environments, in this example a Bayland Urgent Care Physician tenant environment 320, and a Valley Health Physician tenant environment 330.

In accordance with an embodiment, each partition 321, 331 can define a different virtual target on which to accept incoming traffic for that tenant environment, and a different URL 322, 332 for connecting to the partition and to its resources 324, 334, including in this example either a bayland urgent care database, or a valley health database respectively. The database instances can use compatible schemas, since the same application code will execute against both databases. When the system starts the partitions, it can create the virtual targets and connection pools to the respective database instances.

Clustering

An application server cluster is part of an application domain, and can comprise multiple application server instances running simultaneously and working together to provide increased scalability and reliability. All server instances in a cluster can reside in a same domain, and appear to clients as a single application server instance. A plurality of features or services can be provided to enable the clustering in an application server environment.

These features or services may need to be modified or enhanced for a multi-tenant application server environment, so they can continue to function in the multi-tenant application environment.

In accordance with an embodiment, described herein is a system and method for supporting clustering in a multitenant application server environment. The system includes a domain with a plurality of server clusters, and a plurality of partitions, wherein each cluster is homogenously configured and targeted by one or more partitions. An application programming interface (API) can be used to initiate a resource group across-cluster migration within a partition. The API can invoke a replication manager, which queries a target cluster for a runtime topology for use in determining where to store primary session; migrates the primary session to a determined server instance in the target cluster. Additional clustering features, such as cluster messaging service, leasing service, singleton service management, session replication, clustered JNDI, and use of domain front-end load balancing, can be supported.

In accordance with an embodiment, before migrating a resource group within the partition from a source to a target cluster, the target cluster is to be prepared, wherein the partition is to be activated on the target cluster, and the resources and applications in the resource groups are to be deployed and running in the partition in the target cluster.

Figure 6:
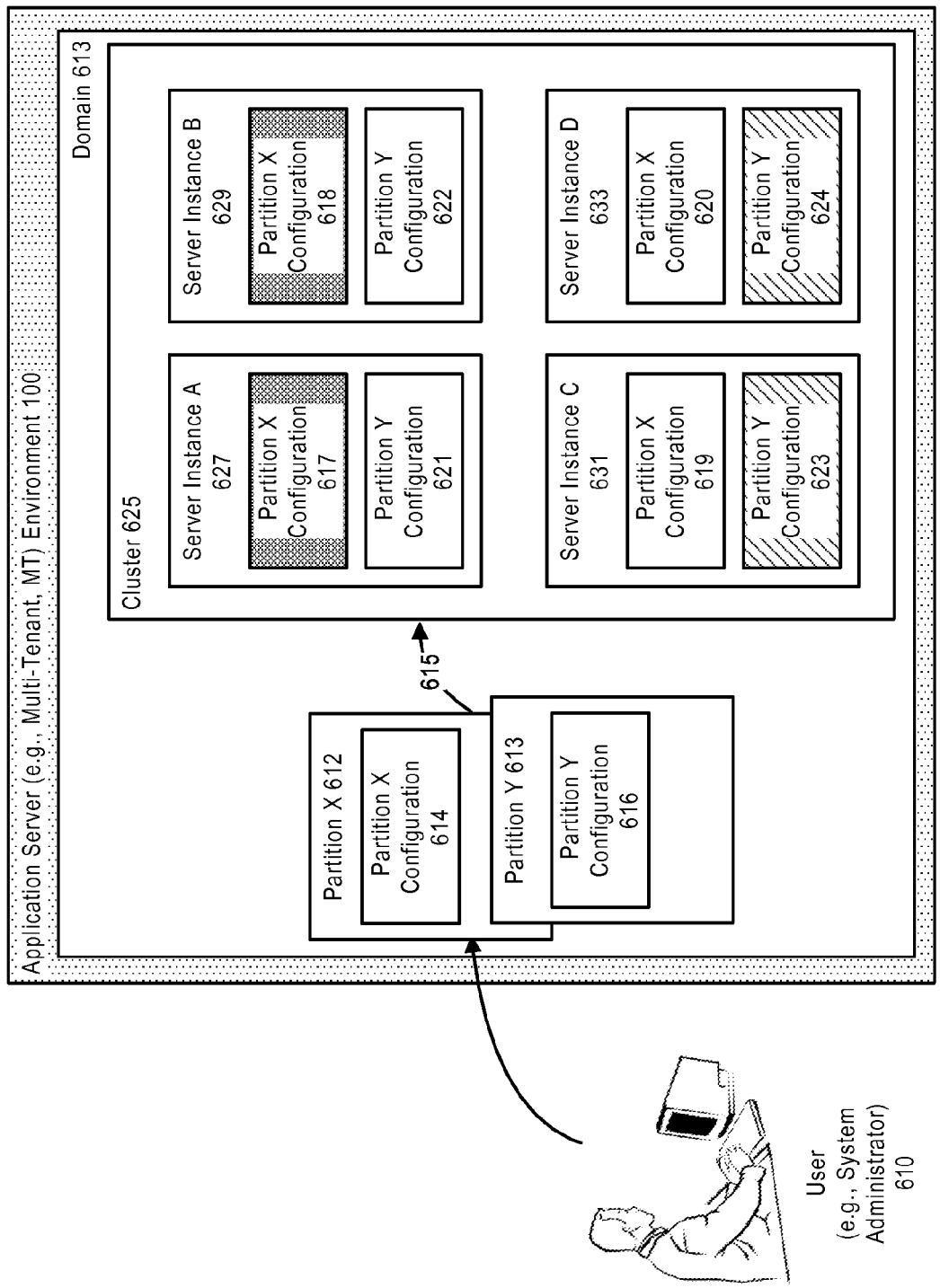
FIG. 6 illustrates a server cluster targeted by one or more partitions in an application server, cloud, or other environment, in accordance with an embodiment.

FIG. 6 illustrates a server cluster targeted by one or more partitions in an application server, cloud, or other environment, in accordance with an embodiment.

As shown in FIG. 6, a cluster 625 in an application server domain 613 can include a plurality of application server instances (for example, server instance A 627, server instance B 629, server instance C 631, and server instance D 633). A user (for example, system administrator) can configure a plurality of partitions (for example, partition X 612 and partition Y 613) using partition configurations (for example, partition X configuration 614 and partition Y configuration 616).

In accordance with an embodiment, each partition configuration can define one or more resource groups and a set of resources in the one or more resource groups. These partitions can be targeted 615 to the cluster, which can cause the same partition configuration for each partition and the set of resources defined in the resource groups in that partition to be homogenously deployed on each server in the cluster.

For example, the partition configuration for partition X or partition Y can be deployed on each of the server instances in the cluster, as shown by partition X configurations 617, 618, 619 and 620; and partition Y configurations 621, 622, 623 and 624.

In accordance with an embodiment, when a partition configuration for partition is activated on a server instance, the server instance is set up to run the partition.

As further shown, a partition does not need to be activated on a particular server instance even if a partition configuration is deployed thereon.

For example, partition X is activated on server instance A and server instance B; and partition Y is activated on server instance C and server instance D. A partition administrator for a partition can access only those server instances on which the partition is activated. Although partition X and partition Y are both targeted to a same cluster, the view of the cluster for each partition or tenant can be different.

In accordance with an embodiment, a server instance can have two or more partitions activated on the server instance, and a partition may not be aware of the existence of the other partitions on the server instance.

Figure 7:
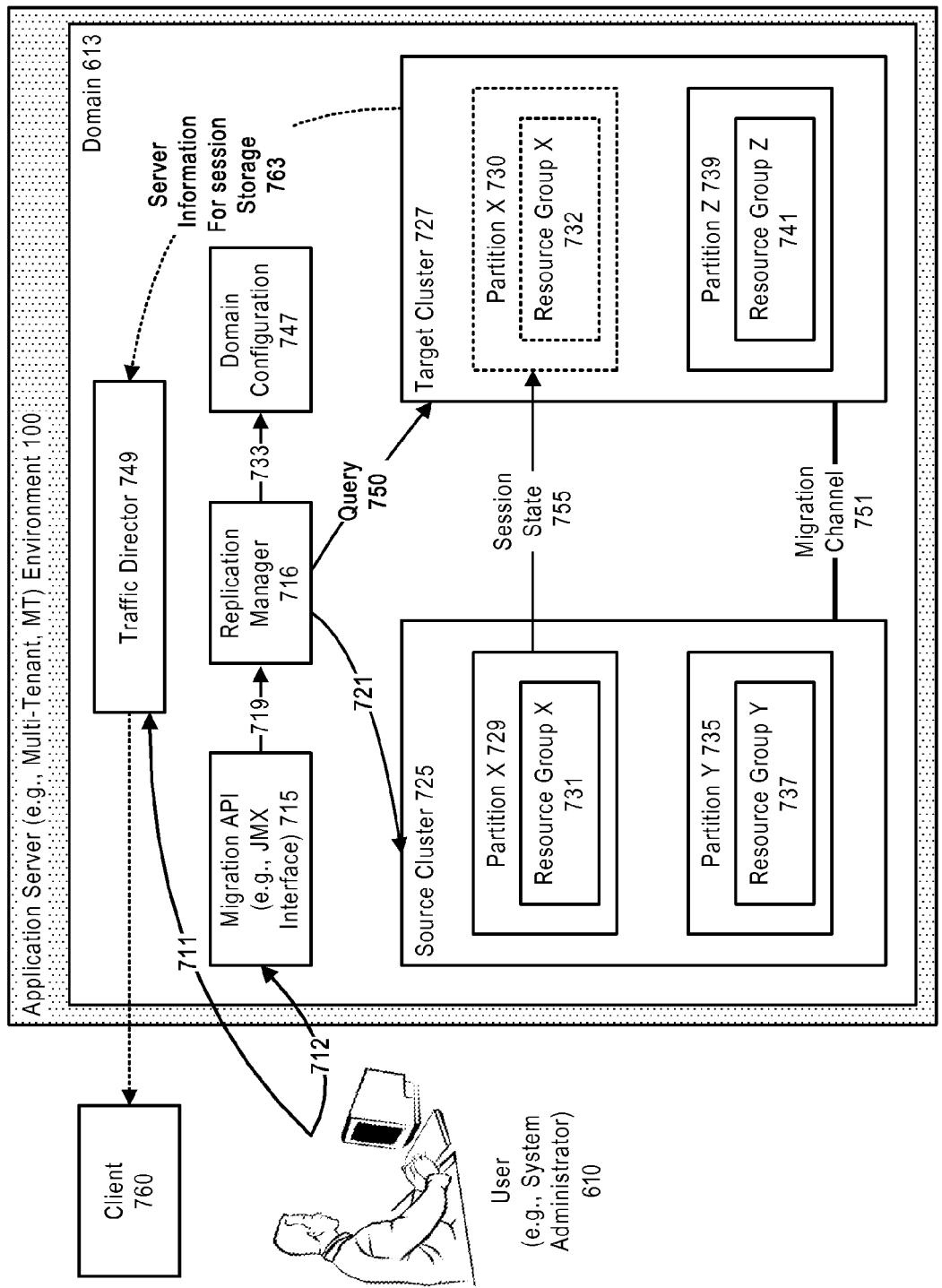
FIG. 7 illustrates a system for supporting clustering in an application server, cloud, or other environment, in accordance with an embodiment.

FIG. 7 illustrates a system for supporting clustering in an application server, cloud, or other environment, in accordance with an embodiment.

In accordance with an embodiment, a resource group in a partition can be migrated from one cluster to a different cluster in the same domain, without interrupting a client's communication with the partition.

As shown in FIG. 7, the application server domain can include a source cluster 725 and a target cluster 727. The source cluster is targeted by partition X 729 and partition Y 735. Partition X 729 includes a resource group X 731, and partition Y 735 includes a resource group Y 737. The target cluster is targeted by partition X 730, which includes a resource group X 732; and partition Z 739, which includes a resource group Z 741.

In accordance with an embodiment, before the resource group migration is initiated, partition X needs to be activated in the target cluster, and applications and resources in the resource group X in partition X needs to be deployed and running in the target cluster.

In addition, a traffic director 749 can be configured 711 to route requests associated with a new session to the target cluster, and continue to route requests associated with an existing session to the source cluster.

In accordance with an embodiment, a migration API 715 can be used by a client application associated with the user to initiate a resource group migration. The initiating client application can be a lifecycle manager, an administration console, or a WebLogic server, or another administrative component.

In accordance with an embodiment, the migration API can include interfaces exposed by a remote RMI object bound into a JNDI tree, or interfaces of Java Management Extensions (JMX) on a runtime bean (for example, ClusterRuntimeMbean). The remote RMI object can provide both a synchronous and an asynchronous mode for initiating a resource group migration. In the asynchronous mode, a callback is registered for notifications of migration success or failure; in the synchronous mode, a calling thread is blocked until the migration completes.

In accordance with an embodiment, a plurality of parameters (for example, name of a resource group to be migrated, name of a partition in which the resource group resides, and name of a target cluster) can be provided to the migration API, which can use the parameters to invoke 719 a replication manager 716 for migrating 721 session state associated with the resource group X in partition X. The replication manager can obtain 733 the target cluster's configuration information from a domain configuration 747; and use the configuration information to query 750 the target cluster for a runtime topology of the target cluster. The runtime topology can be used to determine which running server instance can be used to store primary session from the source cluster.

Once the session state associated with the resource group X is migrated 755, using a configured or default migration channel 751, from the source to the target cluster, new requests to the resource group X can use the session state stored in the determined server instance. The target cluster can use a pre-configured approach to select a secondary server instance for storing a replica of the primary session state. The primary and secondary server instance information can be piggy-backed 763 to a client 760 on responses to requests from the client.

Figure 8:
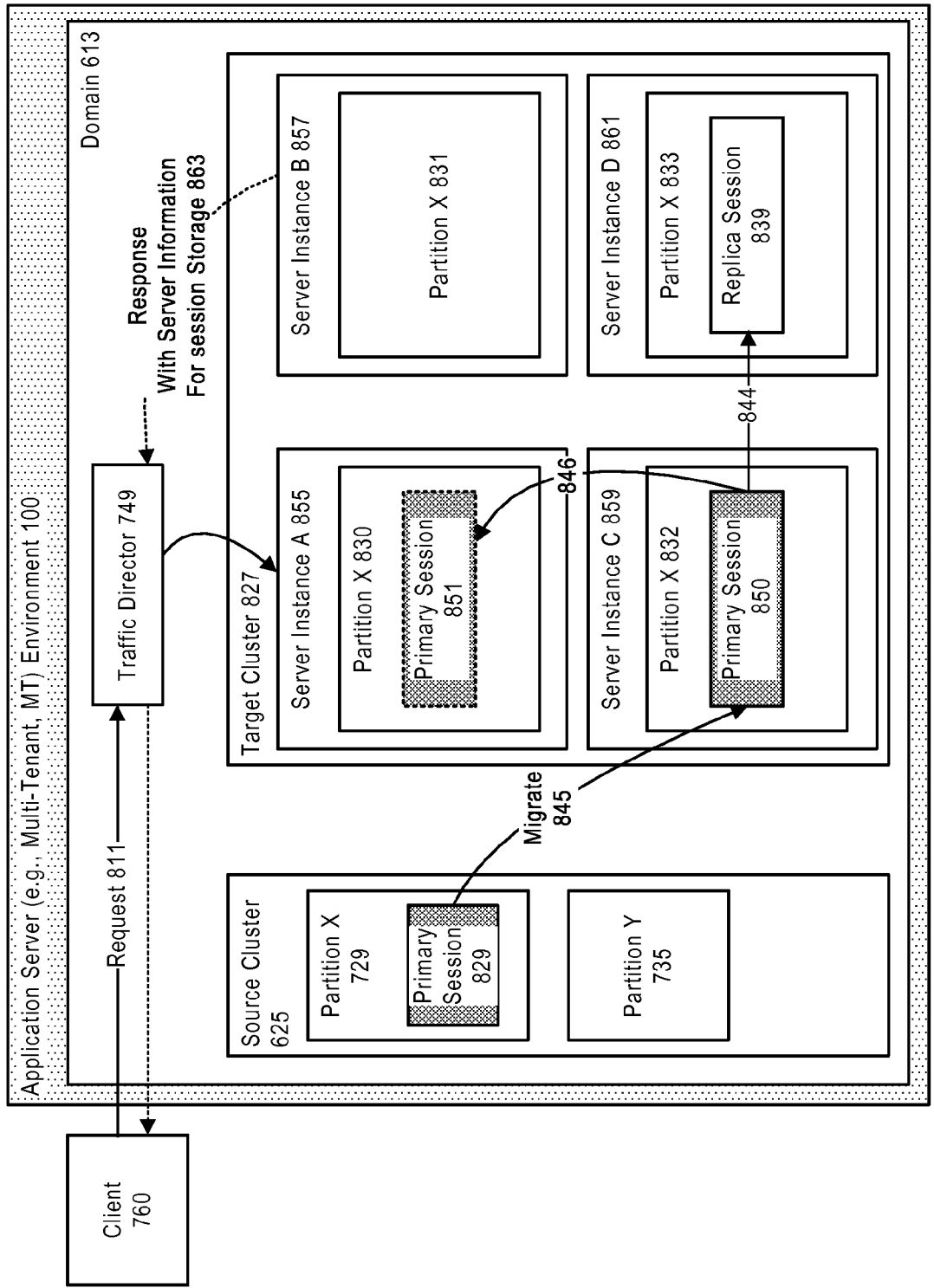
FIG. 8 further illustrates a system for supporting clustering in an application server, cloud, or other environment, in accordance with an embodiment.

FIG. 8 further illustrates a system for supporting clustering in an application server, cloud, or other environment, in accordance with an embodiment.

In accordance with an embodiment, after all session state associated with the resource group X in the partition has been migrated to a target cluster 827, the traffic director can be updated to stop routing any client request for the source group X to the source cluster.

As shown in FIG. 8, the target cluster can include server instance A 855, server instance B 857, server instance C 859 and server instance D 861, wherein partition X is homogeneously configured and activated on each server instance, as shown by partition X 830, partition X 831, partition X 832 and partition X 833.

In accordance with an embodiment, when a primary session 829 is migrated 845 from the source cluster to a determined server instance (for example, server instance C) in the target cluster, a replica session 839 of the migrated primary session 850 in the target cluster can be created 844 in partition X on server instance D, as determined by the source cluster using a pre-configured method.

In accordance with an embodiment, when a client initiates a session with the source cluster before the resource group migration, and continues to send requests to the resource group after the migration, one or more of the new requests may be misdirected, to a server instance (for example, server instance A), which is different from the server instance that stores the primary session (i.e. server instance C).

In accordance with an embodiment, the target cluster can use a session state query protocol to retrieve 846 the existing session state, from the appropriate server, for use by the misdirected requests, and piggy-back 863 information of the server instances that store the primary and replica sessions to the client on a response to the client requests, so that subsequent requests are not misdirected.

Figure 9:
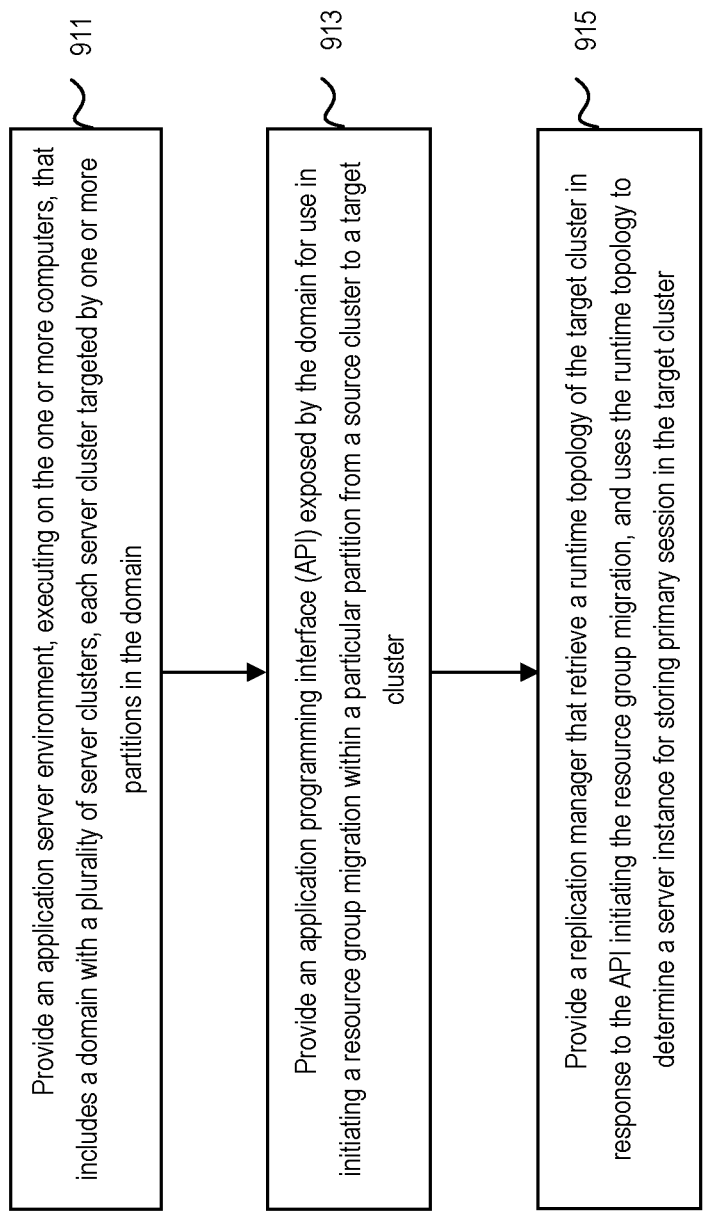
FIG. 9 illustrates a method for supporting clustering in an application server, cloud, or other environment, in accordance with an embodiment.

FIG. 9 illustrates a method for supporting clustering in an application server, cloud, or other environment, in accordance with an embodiment.

As shown in FIG. 9, at step 911, an application server environment, executing on one or more computers can be provided, wherein the application server environment includes a domain with a plurality of server clusters, each server cluster targeted by one or more partitions in the domain.

At step 913, an application programming interface (API) exposed by the domain can be used to initiate a resource group migration within a particular partition from a source cluster to a target cluster.

At step 915, a replication manager can be provided to retrieve a runtime topology of the target cluster in response to the API initiating the resource group migration, and uses the runtime topology to determine a server instance for storing primary session in the target cluster.

Additional Clustering Features

In accordance with an embodiment, additional features and services for clustering support in the multi-tenant application server environment include:

Support for Cluster Messaging Service: In accordance with an embodiment, to support a cluster messaging service, the cluster broadcast protocol can be partition aware. Stateless cluster transports can define a partition ID in the message envelope to properly demux messages. For example, clustered JNDI events (bind/unbind/rebind) need to be dispatched to an appropriate partitioned JNDI tree. Non-partition specific cluster messages (cluster broadcast and heartbeat) can be exempt from this requirement.

Leasing Service Management: In accordance with an embodiment, leasing information can be enhanced to scope leases to partitions. This can be accomplished by defining a partition ID in a lease entry. The lease entry can be enhanced to include a new partition ID column. For example, a database schema to add a new column to accommodate the partition ID. Alternatively, the partition ID can be encoded into the lease entry's name (partition encoded keys).

Singleton Service Management: In accordance with an embodiment, there can be several types of singleton services supported by the application server: Application scoped (packaged and deployed within an application); Domain scoped (defined in a domain and deployed as a standalone service within an application server instance); and Migratable Target (a grouping of standalone services hosted within a single application server instance in a cluster). Each type of singleton service can be enhanced to be partition aware to uniquely identify application scoped singletons configured in different partitions. Domain scoped singletons can be uniquely named, and need not to be associated with any partition for them to be uniquely identified.

Session Replication Framework: In accordance with an embodiment, the session replication framework can be refactored to separate sessions by partition and by type (primary and secondary) in order to provide separation of data; hooks for memory SLA (e.g. easier to obtain metrics such as amount of memory stateful sessions consume per partition); and optimum usage of resources.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for supporting clustering in a multitenant application server environment, comprising:
   a plurality of computers, each including a microprocessor;
   an application server domain provided on the plurality of computers;
   a source cluster and a target cluster included in the application server domain, wherein the source cluster comprises a first subset of the plurality of computers and wherein the target cluster comprises a second subset of the plurality of computers;
   a first partition that is active on a computer of the first subset of computers that comprises the source cluster, wherein the first partition includes a resource group;
   a second partition that is active on a computer in the second subset of computers that comprises the target cluster, wherein the first partition and the second partition represent respective runtime subdivisions of the application server domain;
   an application programming interface (API) exposed by the application server domain; and
   a replication manager;
   wherein the API receives a plurality of parameters, including an identifier of the resource group, an identifier of the first partition, and an identifier of the target cluster, and invokes the replication manager to migrate a session state associated with a session of the resource group; and
   wherein the replication manager, upon the invocation:
      queries the target cluster, based on the identifier of the target cluster, for a runtime topology of the target cluster, uses the runtime topology to determine that the computer in the second subset of computers that comprises the target cluster can be used to store the session in the target cluster, and migrates, based on the identifier of the resource group, the session state associated with the session of the resource group to the second partition.

2. The system of claim 1, wherein a partition configuration of the partition defines the resource group and a set of resources included in the resource group.

3. The system of claim 1, wherein the replication manager obtains configuration information of the target cluster from a domain configuration.

4. The system of claim 3, wherein the replication manager uses the configuration information to query the target cluster for the runtime topology.

5. The system of claim 1, wherein the partition is configured and activated in the target cluster before the resource group migration is initiated.

6. The system of claim 1, wherein when a client request is directed to a computer instance in the target cluster that is different from the computer in the second subset of computers that comprises the target cluster for storing the session, the target cluster retrieves the session from the computer in the second subset of computers that comprises the target cluster, and piggy-backs information of the computer in the second subset of computers that comprises the target cluster on a response to the client request to the client.

7. The system of claim 1, wherein the target cluster uses a pre-configured approach to select a computer instance for storing a replica of the session after the session is migrated.

8. The system of claim 7, wherein information of the computer instance for storing the session replica is piggy-backed on the response to the client request to the client.

9. The system of claim 1, wherein each computer instance in the source and target clusters supports one or more partitions.

10. The system of claim 1, wherein a first computer instance in a cluster support a first partition, and a second computer instance in the cluster supports a second partition.

11. A method for supporting clustering in a multitenant application server environment, comprising:
providing an application server domain on a plurality of computers;
providing a plurality of application server clusters as part of the application server domain, wherein the plurality of application server clusters includes a source cluster and a target cluster, and wherein the source cluster comprises a first subset of the plurality of computers and wherein the target cluster comprises a second subset of the plurality of computers;
providing a first partition that is active on a computer of the first subset of computers that comprises the source cluster, wherein the first partition includes a resource group;
providing a second partition that is active on a computer in the second subset of computers that comprises the target cluster, wherein the first partition and the second partition represent respective runtime subdivisions of the application server domain;
exposing an application programming interface (API) by the application server domain; and
providing a replication manager;
receiving, by the API, a plurality of parameters, including an identifier of the resource group, an identifier of the partition, and an identifier of the target cluster;

invoking, by the API, the replication manager to migrate a session state associated with a session of the resource group;
upon the invocation, querying the target cluster, based on the identifier of the target cluster, for a runtime topology of the target cluster;
using the runtime topology to determine that the computer in the second subset of computers that comprises the target cluster can be used to store the session in the target cluster; and
migrating, based on the identifier of the resource group, the session state associated with the session of the resource group to the second partition.

12. The method of claim 11, wherein a partition configuration of the partition defines the resource group and a set of resources included in the resource group.

13. The method of claim 11, wherein the replication manager obtains configuration information of the target cluster from a domain configuration.

14. The method of claim 13, wherein the replication manager uses the configuration information to query the target cluster for the runtime topology.

15. The method of claim 11, wherein the partition is configured and activated in the target cluster before the resource group migration is initiated.

16. The method of claim 11, wherein when a client request is directed to a computer instance in the target cluster that is different from the computer in the second subset of computers that comprises the target cluster for storing the session, the target cluster retrieves the session from the computer in the second subset of computers that comprises the target cluster, and piggy-backs information of the computer in the second subset of computers that comprises the target cluster on a response to the client request to the client.

17. The method of claim 11, wherein the target cluster uses a pre-configured approach to select a computer instance for storing a replica of the session after the session is migrated.

18. The method of claim 17, wherein information of the computer instance for storing the session replica is piggy-backed on the response to the client request to the client.

19. The method of claim 11, wherein each computer instance in the source and target clusters supports one or more partitions.

20. A non-transitory computer readable storage medium, including instructions stored thereon which when read and executed by one or more computers cause the one or more computers to perform the steps comprising:
providing an application server domain on a plurality of computers;
providing a plurality of application server clusters as part of the application server domain, wherein the plurality of application server clusters includes a source cluster and a target cluster, and wherein the source cluster comprises a first subset of the plurality of computers and wherein the target cluster comprises a second subset of the plurality of computers;
providing a first partition that is active on a computer of the first subset of computers that comprises the source cluster, wherein the first partition includes a resource group;
a second partition that is active on a computer in the second subset of computers that comprises the target cluster, wherein the first partition and the second partition represent respective runtime subdivisions of the application server domain;

exposing an application programming interface (API) by the application server domain; and providing a replication manager;

receiving, by the API, a plurality of parameters, including an identifier of the resource group, an identifier of the partition, and an identifier of the target cluster;

invoking, by the API, the replication manager to migrate a session state associated with a session of the resource group;

upon the invocation, querying the target cluster, based on the identifier of the target cluster, for a runtime topology of the target cluster;

using the runtime topology to determine that the computer in the second subset of computers that comprises the target cluster can be used to store the session in the target cluster; and migrating, based on the identifier of the resource group, the session state associated with the session of the resource group to the second partition.

* * * * *